Dec. 5, 1961 H. J. KISHI ET AL 3,012,228

TIMING CIRCUIT

Filed Oct. 16, 1956 6 Sheets-Sheet 1

INVENTORS
HAJIME J. KISHI AND
THOMAS R. SHERIDAN
ANTHONY LIGUORI

BY Charles H. Brown
ATTORNEY

Dec. 5, 1961 H. J. KISHI ET AL 3,012,228

TIMING CIRCUIT

Filed Oct. 16, 1956 6 Sheets-Sheet 2

| | | |
|---|---|---|
| | | FIG. 2C. |
| FIG. 2A. | FIG. 2B. | CODE |

INVENTORS
HAJIME J. KISHI AND
THOMAS R. SHERIDAN
ANTHONY LIGUORI

BY Charles H. Brown
ATTORNEY

INVENTORS
HAJIME J. KISHI AND
THOMAS R. SHERIDAN
ANTHONY LIGUORI
BY Charles H. Brown
ATTORNEY

TIMING CIRCUIT

Filed Oct. 16, 1956 6 Sheets-Sheet 4

INVENTORS
HAJIME J. KISHI AND
THOMAS R. SHERIDAN
ANTHONY LIGUORI
BY Charles H. Brown
ATTORNEY

TIMING CIRCUIT

Filed Oct. 16, 1956 6 Sheets-Sheet 5

INVENTORS
HAJIME J. KISHI AND
THOMAS R. SHERIDAN
ANTHONY LIGUORI
BY Charles H. Brown
ATTORNEY INVENTORS
HAJIME J. KISHI AND
THOMAS R. SHERIDAN
ANTHONY LIGUORI
BY Charles H. Brown
ATTORNEY

United States Patent Office 3,012,228
Patented Dec. 5, 1961

3,012,228

TIMING CIRCUIT

Hajime J. Kishi, Huntington, Thomas R. Sheridan, Brooklyn, and Anthony Liguori, Huntington Station, N.Y., assignors to Radio Corporation of America, a corporation of Delaware Filed Oct. 16, 1956, Ser. No. 616,275
15 Claims. (Cl. 340—172.5)

Figure 1:
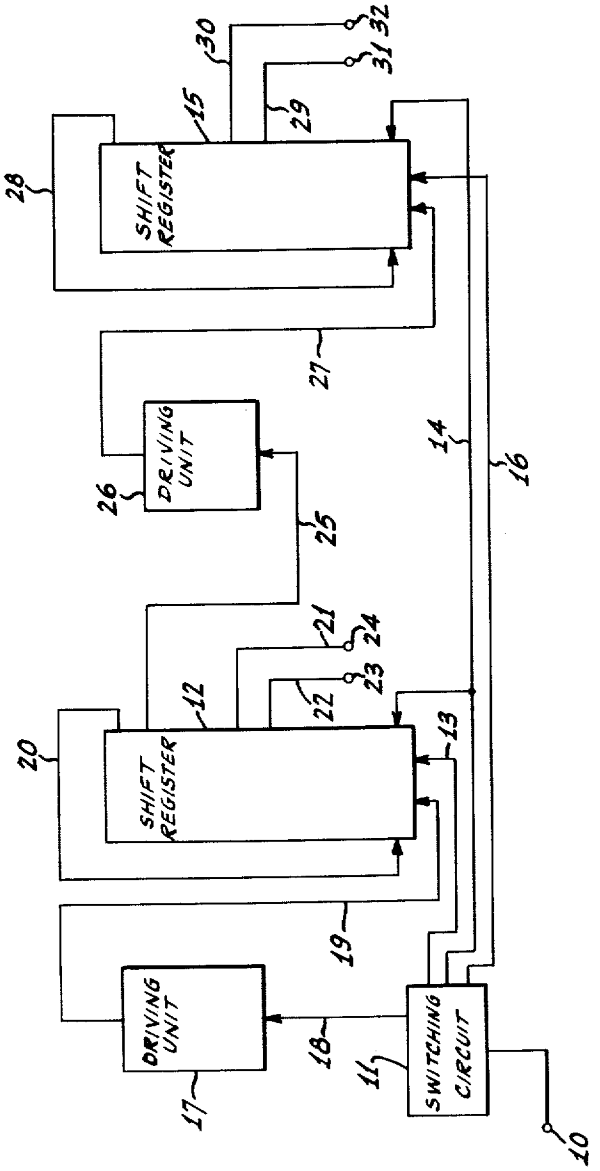

The invention relates to improvements in timing circuits. It particularly relates to an improved circuit arrangement for producing a plurality of timing signals which are made available at different rates of frequency over separate output circuits for application to utilization circuits.

A timing circuit is useful in many applications, and must be provided in every system in which the operation thereof depends upon the functioning of the components included in the system in a certain time sequence. The timing circuit produces the necessary timing signals which are applied to the components of the system in a predetermined manner and cause the components to operate in the proper sequence. For example, the central station at one end of an automatic telegraph communication system generally includes at least a transmitting unit, a receiving unit and various control units. The control units may be in the nature of code converters, frequency correction units and so on. The successful transmission or reception of a message signal by the station requires the use of a timing circuit or circuits to apply timing signals in a predetermined manner to the respective units. The units are each operated, in turn, in response to the timing signals to complete the functions performed thereby, whereby the transmission or reception of a message signal by the station is completed. Computing systems and other types of data handling systems which include a large number of components arranged to operate in a predetermined time sequence are also examples of systems in which a timing circuit arranged to produce a plurality of timing signals for application at different rates of frequency over separate output circuits is useful.

Both electronic and mechanical timing circuits are known in the art. The mechanical timing circuits usually include a number of relays which are arranged in some form of counting chain. Timing signals are produced by the sequential operation of the counting relays in the chain. Priming windings, relays or other components are necessary to condition successive ones of the counting relays for energization. Such mechanical timing circuits are not completely satisfactory because the mechanical components included in this type of system create difficult, mechanical maintenance problems. The electronic timing circuits presently available in the art require a number of electron vacuum tubes which are connected together to form a frequency divider or counting chain, the manner in which the tubes are connected together depending upon the particular application of the timing circuit. While the use of electronic timing circuits avoids some of the problems encountered in using mechanical timing circuits, the electronic timing circuits available in the past tend to be expensive to construct and maintain in terms of components and power consumption. Operating adjustments must be provided to compensate for tube changes and other uncontrollable variables. Further, the number of tubes needed in an electronic timing circuit of the type used in the past causes the timing circuit to be bulky and awkard to handle, thereby adding to the problems encountered in designing equipment including such a timing circuit.

It is an object of the invention to provide an improved electronic timing circuit for producing a plurality of timing signals which are made available at different rates of frequency over separate output circuits.

Another object of the invention is to provide a more compact, simpler and improved timing circuit utilizing magnetic cores to perform functions heretofore performed by electronic equipment.

The objects of the invention are accomplished by a timing circuit arrangement utilizing a first and second magnetic core shift register. Each of the shift registers includes a chain of magnetic cores and is connected as a closed loop shift register. A closed loop shift register is defined as a shift register in which an output core is coupled to an input core, also included in the shift register. When a condition which has been advanced core-by-core along the chain of magnetic cores is advanced out of the output core, it is fed back to an input core in the chain. A closed loop is provided by this feed back arrangement, and the shift register can be operated such that the condition is made to circulate continuously through the shift register.

Signal energy of a predetermined frequency is applied from a suitable source of recurring waves to a switching circuit. The switching circuit is connected to each of the shift registers and functions to control the operation thereof. In addition, the switching circuit is connected to a driving unit for the chain of magnetic cores in the first shift register. The timing circuit of the invention is started in operation by first operating the switching circuit to place a single one of the magnetic cores in the first shift register and a single one of the magnetic cores in the second shift register in an active state or condition, the remaining magnetic cores in the respective shift registers being placed in an inactive condition. Thereafter, the switching circuit is operated to apply the signal energy to the driving unit. The driving unit is responsive to the signal energy to produce a series of current pulses which are selectively applied to the magnetic cores in the first shift register. The current pulses so applied cause the active condition inserted in one of the magnetic cores by the operation of the switching circuit to advance core-by-core along the chain of magnetic cores. Due to the closed loop construction of the shift register, the condition continuously circulates through the shift register so long as the signal energy of recurring waves is applied to the driving unit.

Selected magnetic cores in the first shift register are connected over separate circuits to different output terminals. As the condition is advanced from core to core along the chain of magnetic cores in the first shift register, output pulses are sequentially produced by the successive operation of the magnetic cores in the chain. The output pulses produced are of a frequency determined by the frequency of the current pulses applied to the magnetic cores in the chain from the driving unit and, therefore, by the frequency of the signal energy orginally applied to the driving unit by the operation of the switching circuit. The output pulses are applied in the form of timing signals from the magnetic cores to the different output terminals over the separate circuits.

One of the output pulses produced by the operation of a magnetic core in the first shift register is applied to a second driving unit. The second driving unit is responsive to the output pulses applied thereto to produce a series of current pulses which are selectively applied to the magnetic cores in the second shift register. The current pulses so applied cause the active condition inserted in one of the magnetic cores by the operation of the switching circuit to advance core-by-core through the second shift register. As in the case of the first shift register, the closed loop construction of the second shift register causes the condition to be continuously circulated through the shift register. Selected magnetic cores in the second shift register are connected over separate circuits to different output terminals. As the condition is advanced from core to core through the second shift register, output pulses are sequentially produced which are applied from the magnetic cores to the different output terminals in the form of timing signals. The frequency of the output pulses produced by the second shift register is determined by the frequency of the current pulses applied to the magnetic cores therein from the second driving unit and, therefore, by the frequency of the output pulses originally applied to the second driving unit from the first shift register. Utilization circuits can be connected to the different output terminals connected to the magnetic cores in the second shift register and to the different output terminals connected to the magnetic cores in the first shift register in such a manner that the utilization circuits are made to operate in a desired time sequence in response to the timing signals.

Figure 2A:
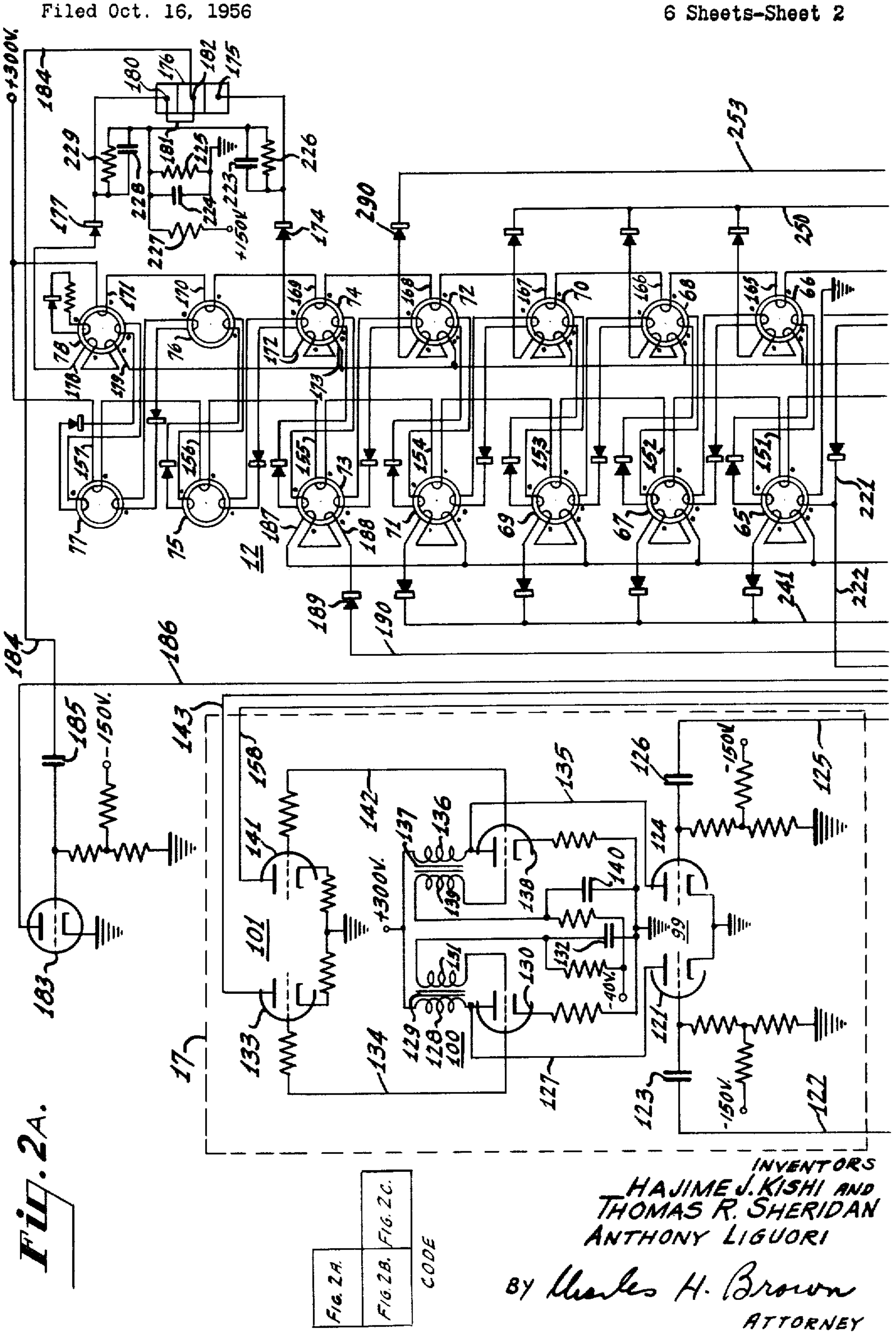
Figure 2B:
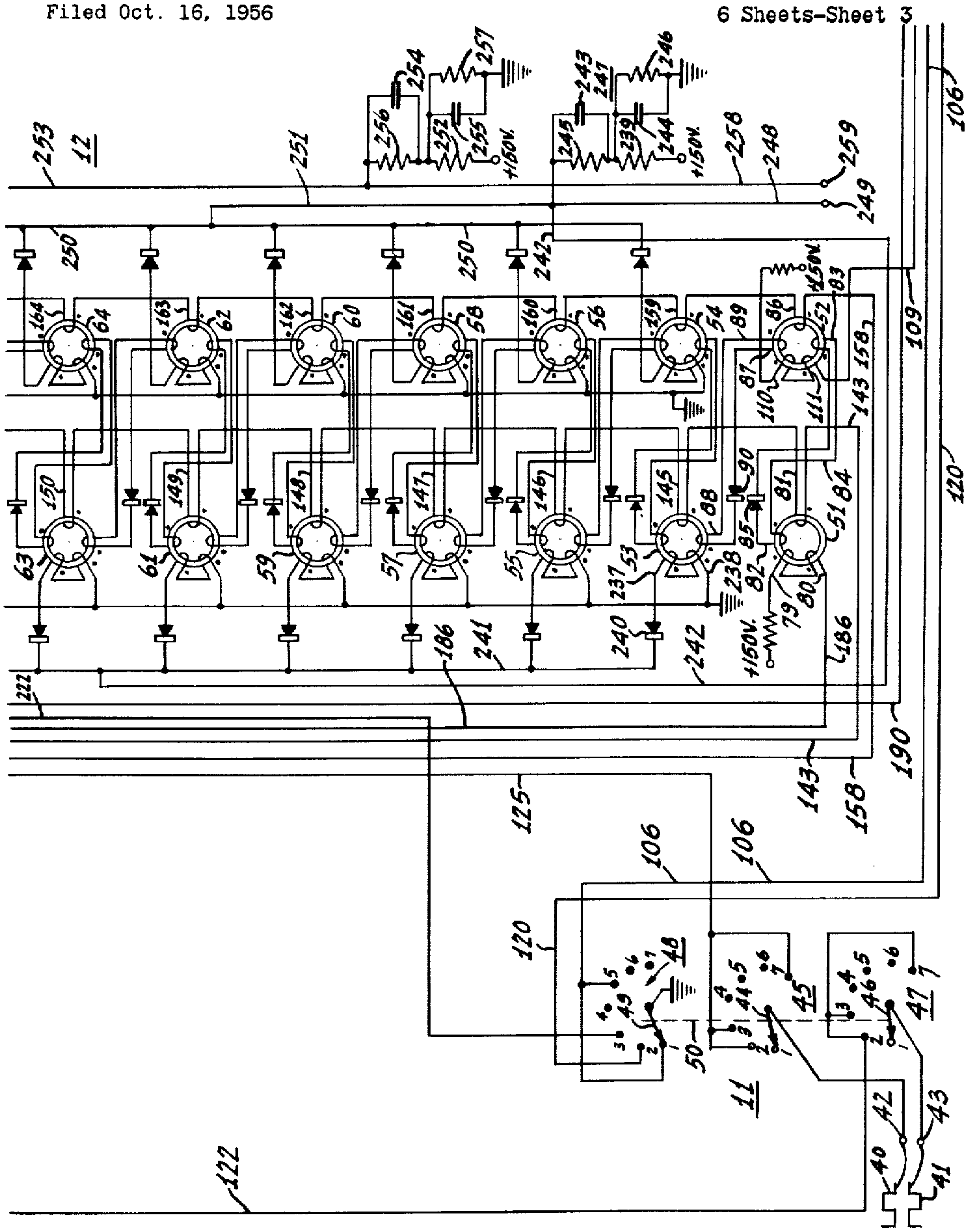
Figure 2C:
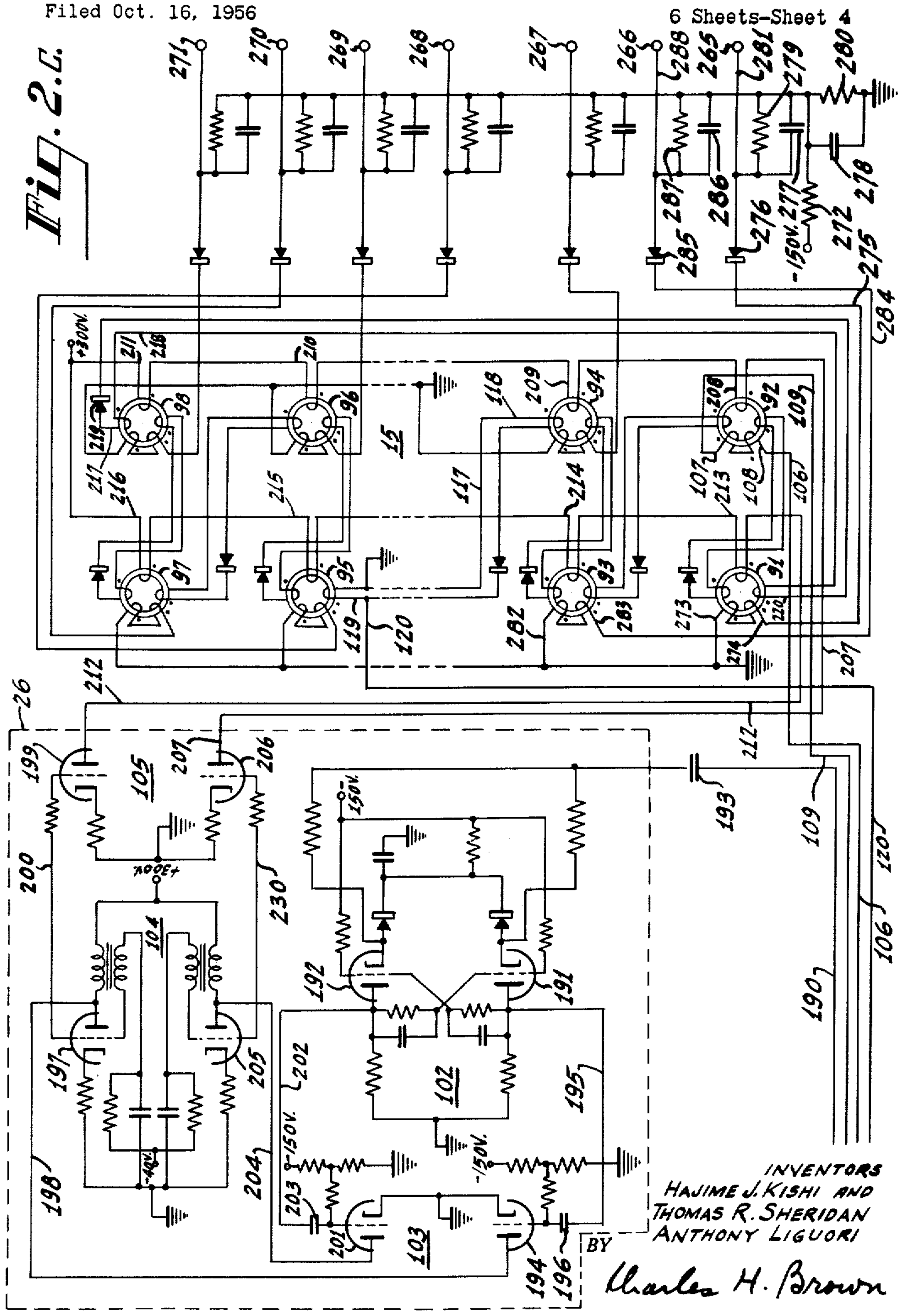
Figure 3:
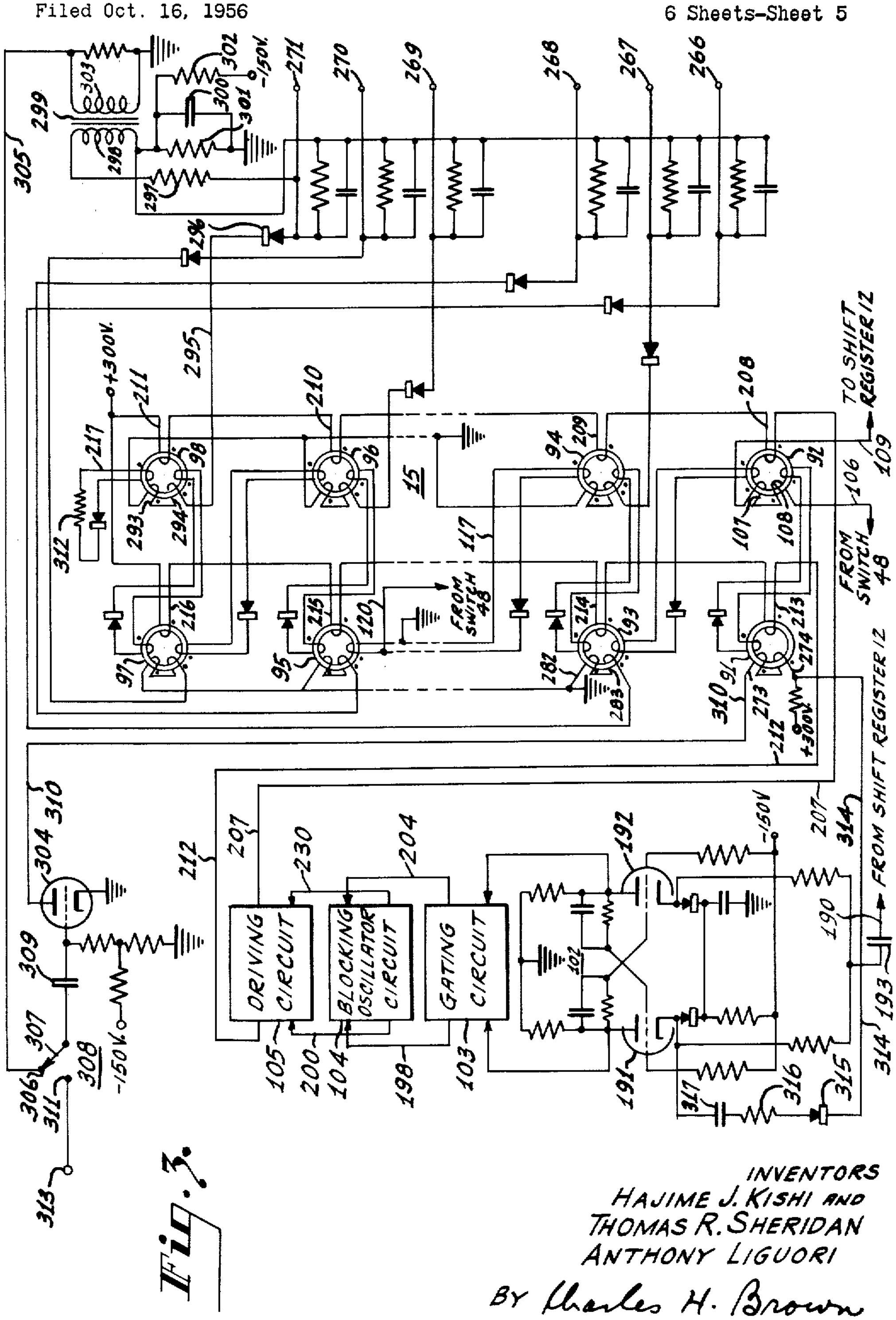
Figure 4:
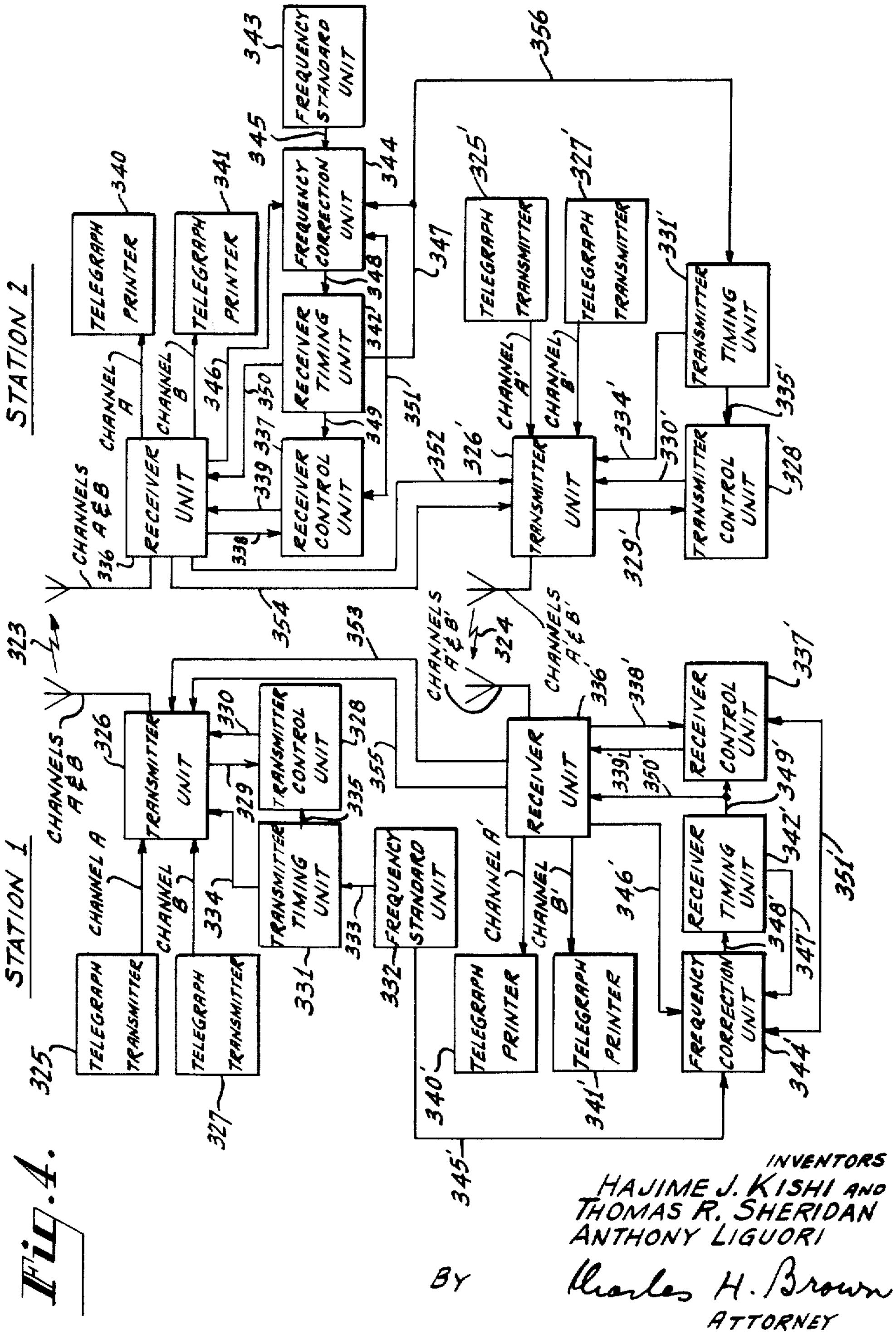

A more detailed description of the invention follows with reference to the accompanying drawing, in which:

FIGURE 1 is a block diagram of a timing circuit according to the invention;

FIGURE 2, which is FIGURES 2A, 2B and 2C taken together, is a circuit diagram of one embodiment of a timing circuit according to the invention;

FIGURE 3 is a circuit diagram of a modification of the timing circuit shown in FIGURE 2 according to the invention; and FIGURE 4 is a block diagram of an automatic telegraph communication system in which the timing circuit of the invention may find application.

Referring to the block diagram shown in FIGURE 1, signal energy is applied from a suitable source to an input terminal 10. The signal energy is applied from the terminal 10 to a switching circuit 11 which is, in turn, connected to a first shift register 12 by leads 13, 14 and to a second shift register 15 by leads 14, 16. The switching circuit 11 is also connected to a driving unit 17 by lead 18. Each of the shift registers 12, 15 includes a chain of magnetic cores. The operation of magnetic cores and of magnetic core shift registers per se is known in the art, and, therefore, a detailed description thereof is unnecessary. A magnetic core is a circuit element having a rectangular hysteresis loop of low coercive force. Certain materials such as molybdenum-Permalloy and manganese-magnesium ferrite exhibit a substantially rectangular hysteresis loop. Input, output and shift windings are arranged on the core. A magnetic core is capable of being magnetized to saturation in either of two directions. In one direction, a positive or active state is said to arise in which the direction of retentivity is opposite to that which would result from the application of a shift current or sensing pulse to the shift winding on the core. In the second direction, a negative or inactive state is said to arise in which the direction of retentivity is the same as that which would result from the application of a shift current pulse to the shift winding on the core. When applied to a magnetic core in the active state, a shift current pulse will cause the inactive state to appear. When applied to a magnetic core already in the inactive state, a shift current pulse will cause no change in state. A magnetic core in the active or positive state is said to contain a "one," and a magnetic core in the negative or inactive state is said to contain a "zero." When a magnetic core is shifted from an active state to an inactive state, a voltage is induced in its output winding for application to a utilization circuit connected thereto. A shift current pulse will have no substantial affect on a magnetic core in the inactive state, and substantially no voltage will be induced in its output winding.

If a "one" is stored in a first magnetic core in a chain of magnetic cores included in a shift register such that the core is in an active state, the application of a shift current pulse to the shift winding on the core causes a voltage to be induced in the output winding on the core. The output winding on the first magnetic core is connected to the input winding on a succeeding core in the chain. The voltage induced in the output winding on the first magnetic core is applied to the input winding on the next magnetic core in the chain, causing a "one" to be stored in the next magnetic core. Thus, the "one" is transferred from the first magnetic core to a second magnetic core included in the shift register. Additional shift current pulses can be selectively applied to the magnetic cores in the chain of magnetic cores to cause the "one" to advance core-by-core along the chain of magnetic cores included in the shift register. As a result of this action, a magnetic core shift register can be adapted to perform various functions.

In the timing circuit of the invention, as shown in the block diagram given in FIG. 1, the switching circuit 11 is first operated to cause a current to be applied over lead 14 to one of the magnetic cores in the first shift register 12 and to one of the magnetic cores in the second shift register 15. The magnetic cores to which the current is applied are made to assume an active state having a "one" stored therein. It is possible that a "one" may also be stored in one or more of the other magnetic cores in the respective shift registers 12, 15. This situation may arise as the result of a previous operation of the timing circuit or may be due to the fact that the magnetic cores were made to assume an active state prior to or during the installation thereof in the respective shift registers 12, 15. The proper operation of the timing circuit requires that only a single "one" be advanced through the first shift register 12 and that only a single "one" be advanced through the second shift register 15. Before the timing circuit can be placed in continuous operation, therefore, it is necessary to clear the respective shift registers 12, 15 of all the "ones" stored therein.

The switching circuit 11 is operated to complete a ground connection over lead 16 to an output winding on one of the magnetic cores in the shift register 15 and to apply the signal energy applied to the switching circuit 11 from terminal 10 to the driving unit 17 over lead 18. The term ground, as used in the specification, is to be understood as referring to a point of fixed reference potential. The driving unit 17 functions in response to the signal energy to produce a series of current pulses which are selectively applied to the shift windings on the magnetic cores in the shift register 12 over leads represented by lead 19. The "one" originally inserted in a magnetic core by the operation of the switching circuit 11, as well as any other "ones" stored in other magnetic cores, are advanced core-by-core through the shift register 12. The shift register 12 is connected as a closed loop shift register. An output core is coupled by means represented by lead 20 to an input core. As a "one" is advanced out of the output core, it is fed back to the input core over lead 20 such that the "one" will continuously circulate through the shift register 12. The magnetic cores in the shift register 12 are connected by a plurality of separate circuits, represented by leads 21, 22, to different output terminals, represented by terminals 23, 24. As a "one" is advanced from one core to the next, output pulses are sequentially produced by the successive operation of the magnetic cores which are made available in the form of timing signals for application over the leads 21, 22 to the different output terminals 23, 24. The magnetic cores are connected to the different output terminals 23, 24 in such a manner that the timing signals can be made to appear at the respective terminals 23, 24 either individually or in trains of timing signals. The frequency of each of the timing signals is determined by the frequency of the signal energy applied to the driving unit 17, and the timing signals each represent, in effect, a division of the frequency of the signal energy. As pointed out above, a number of "ones" may be circulating through the shift register 12 at this time, causing the timing signals to appear at the output terminals 23, 24 in a sequence other than that desired. However, since the above action will occur during a warm-up period, it will not disrupt the proper operation of utilization circuits connected to the output terminals 23, 24 and operated in response to the timing signals.

One of the output pulses produced by the operation of a magnetic core in the shift register 12 when a "one" is advanced out of the core is applied over a lead 25 to a driving unit 26. The driving unit 26 operates in response to the output pulse, occurring at a particular frequency, to produce a series of current pulses which are selectively applied over leads represented by lead 27 to the shift windings on the magnetic cores in the second shift register 15. The "one" originally inserted in a magnetic core by the operation of the switching circuit 11, as well as any other "ones" stored in other magnetic cores, are advanced core-by-core through the shift register 15. As in the case of the first shift register 12, the second shift register 15 is connected as a closed loop register. An output core is coupled by means represented by lead 28 to an input core. Normally, a "one" advanced out of the output core is fed back to the input core such that the "one" continuously circulates through the shift register 15. Because of the ground connection completed to the output winding on one of the magnetic cores over lead 16, however, each "one" originally stored in the shift register 15 and advanced therethrough by the operation of the driving unit 26 is passed to ground. All of the "ones" stored in the chain of magnetic cores are cleared out of the shift register 15 such that each of the magnetic cores is made to assume an inactive state having a "zero" stored therein.

The switching circuit 11 is then operated to remove the signal energy from the driving unit 17. The ground connection completed over lead 16 is removed, and a ground connection is completed over lead 13 to the output winding on one of the magnetic cores in the shift register 12. Following the completion of the ground connection over lead 13, the switching circuit 11 is again operated to apply the signal energy to the driving unit 17 over lead 18. Each "one" in the chain of magnetic cores is advanced core-by-core through the shift register 12, and is passed to ground by means of the ground connection completed over lead 13 by the operation of the switching circuit 11. All of the "ones" stored in the chain of magnetic cores are cleared out of the shift register 12 such that each of the magnetic cores is made to assume an inactive state having a "zero" stored therein. At this time, therefore, all of the magnetic cores in the first shift register 12 and in the second shift register 15 are in an inactive state having a "zero" stored therein.

Current is then applied by the operation of the switching circuit 11 to one of the magnetic cores in the shift register 12 and to one of the magnetic cores in the shift register 15 over lead 14. The magnetic cores to which the current is applied are made to assume an active state such that a "one" is stored therein. Thereafter, the signal energy is applied from the switching circuit 11 to the driving unit 17, and the driving unit 17 is operated to apply the series of current pulses to the shift windings on the magnetic cores in the shift register 12. The single "one" stored in the chain of magnetic cores is made to continuously circulate from core to core through the shift register 12. Output pulses are sequentially produced by the successive operation of the magnetic cores and are applied in the form of timing signals over the separate leads 21, 22 to the different output terminals 23, 24. As mentioned above, the timing signals may be made to appear individually or in trains of timing signals at the respective terminals 23, 24.

The output pulse produced by the operation of one of the magnetic cores is applied over lead 25 to the driving unit 26, and a series of current pulses of a frequency determined by the frequency of the output pulse are applied to the shift windings on the magnetic cores in the shift register 15. The single "one" stored in the chain of magnetic cores is made to continuously circulate from core to core through the shift register 15. The magnetic cores are connected over separate circuits, represented by leads 29, 30 to different output terminals, represented by terminals 31, 32. Output pulses are sequentially produced by the successive operation of the magnetic cores and are applied in the form of timing signals to the different output terminals 31, 32 over the separate leads 29, 30. The timing signals may be made to appear individually or in trains of timing signals at the respective terminals 31, 32. The frequency of the timing signals is determined by the frequency of the output pulse produced by the operation of the first shift register 12. Each of the timing signals produced by the operation of the shift register 15, therefore, represents, in effect, a further division over that produced by the operation of the shift register 12 of the frequency of the signal energy originally applied to the driving unit 17.

Reference will now be made to the circuit diagram of an embodiment of the invention given by way of example and shown in FIG. 2, FIGS. 2A, 2B and 2C taken together. To assist in an understanding of the invention, voltage values have been assigned to various positive and negative terminals connected to suitable sources of potential and arranged in the circuit diagram given in FIG. 2. The values, however, are given only by way of example, and can be altered to meet the requirements of a particular application without departing from the spirit of the invention. Two square waves 40, 41 of the same frequency and one hundred and eighty degrees out of phase with each other are applied individually from a suitable source to input terminals 42, 43. Terminal 42 is connected to the armature 44 of a switch 45, while terminal 43 is connected to the armature 46 of a second switch 47. The switches 45, 47, in addition to the armatures 44, 46, respectively, each include seven contact positions and are included in the switching circuit 11 referred to in connection with the block diagram given in FIG. 1. The switching circuit 11 also includes a third switch 48. Switch 48 includes seven contact positions and an armature 49 which is connected to ground. A mechanical control device, represented by dotted line 50, is connected to the armatures 49, 44, 46 and functions either automatically or manually to cause the armatures 49, 44, 46 to simultaneously move from one contact position of the respective switches 48, 45, 47 to the next. Thus, the armatures 49, 44, 46 are made to engage the first contact position of the respective switches 48, 45, 47. Upon the further operation of the mechanical control device 50, the armatures are made to engage the second contact position of the respective switches 48, 45, 47 and so on.

The embodiment of the invention, as shown in the circuit diagram given in FIG. 2, includes a first magnetic core shift register 12 and a second magnetic core shift register 15. The shift register 12 includes a chain of twenty-eight magnetic cores 51 through 78 arranged in a manner known in the art. The type of magnetic core shift register shown is generally referred to as a two core per bit shift register. The odd numbered magnetic cores constitute a line of storage cores, while the even numbered magnetic cores constitute a line of temporary storage cores. Input, output and shift windings are arranged on each of the magnetic cores. The relative polarity of the respective windings on each of the magnetic cores in the first shift register 12, as well as in the second shift register 15, is indicated by a dot adjacent one of the terminals thereof in accordance with the usual transformer convention. Assuming for the moment that a current flows through the input windings 79, 80 on the first magnetic core 51 in the first shift register 12, the negative voltage induced in the input windings 79, 80 causes the magntic core 51 to assume an active state having a "one" stored therein. If a shift current pulse is thereafter applied to the shift winding 81, a voltage is induced in the output winding 82. The voltage induced in the output winding 82 causes current to be applied to the input winding 83 on the next magnetic core 52 in the chain over a connection 84 including an unidirectional impedance device 85, for example, a rectifier. Various other unidirectional impedance devices are used elsewhere in the timing circuit. The devices are shown in FIG. 2 and are identified in the specification as rectifiers. It is to be understood that the embodiment of the invention is not limited to the use of the particular type of device shown but that other devices known in the art which are adapted to pass current therethrough in only one direction may be used without departing from the spirit of the invention. The rectifier 85 is poled in the proper direction to permit the passage of current from the output winding 82 to the input winding 83. The magnetic core 51 assumes an inactive state having a "zero" stored therein. The second magnetic core 52 operates in response to the voltage induced in the input winding 83 to assume an active state having a "one" stored therein. Thus, the "one" is transferred or advanced from the first magnetic core 51 to the second magnetic core 52.

When a shift current pulse is applied to the shift winding 86 on the magnetic core 52, a voltage is induced in the output winding 87. Current is applied from the output winding 87 to the input winding 88 on the third magnetic core 53 in the chain over a connection 89 including rectifier 90. Magnetic core 52 asumes an inactive state having a "zero" stored therein. The magnetic core 53 operates in response to the voltage induced in the input winding 88 to assume an active state having a "one" stored therein. The "one" is advanced from the second magnetic core 52 to the third magnetic core 53. When the "one" is advanced out of the magnetic core 52, a voltage is also induced in the input winding 83. The rectifier 85 in the connection 84 is, however, poled in the proper direction to prevent current from being applied to the output winding 82 on the magnetic core 51. As a result, the "one" is not fed back from the second magnetic core 52 to the first magnetic core 51.

The remaining magnetic cores in the shift register 12 are connected together and operate in the same manner as the magnetic cores 51, 52. By first applying a shift current pulse to the shift windings on the odd numbered magnetic cores constituting the line of storage cores and then applying a shift current pulse to the shift windings on the even numbered magnetic cores constituting the line of temporary storage cores, a "one" is advanced from core to core along the chain of magnetic cores. The "one" is advanced out of a magnetic core in the line of storage cores and into a magnetic core in the line of temporary storage cores. Upon the application of a shift current pulse to the shift windings on the magnetic cores in the line of temporary storage cores, the "one" is advanced out of the magnetic core in the line of temporary storage core and into the next magnetic core in the line of storage cores and so on. The driving unit 17 which functions to apply the shift current pulses to the magnetic cores of the first shift register 12 in a manner to be described includes a gating circuit 99, a blocking oscillator circuit 100 and a driving circuit 101.

The second shift register 15 includes a chain of magnetic cores 91 through 98. The construction and operation of the second shift register 15 is similar to that of the first shift register 12. While a chain of only eight magnetic cores 91 through 98 is shown in the interest of brevity, it is to be understood that any number of magnetic cores may be included in the chain, as indicated by the dotted lines. For example, the same number of magnetic cores may be used in the second shift register 15 as are used in the first shift register 12. The odd numbered magnetic cores constitute a line of storage cores, while the even numbered magnetic cores constitute a line of temporary storage cores. When a "one" is stored in a magnetic core of the shift register 15, shift current pulses applied first to the shift windings on the magnetic cores in the line of storage cores and then to the shift windings on the magnetic cores in the line of temporary storage cores cause the "one" to be advanced core-by-core through the shift register 15. The driving unit 26 for applying the shift current pulses to the magnetic cores in the second shift register 15 in a manner to be described includes a bistable multvibrator circuit 102, a gating circuit 103, a blocking oscillator circuit 104 and a driving circuit 105.

In the operation of the embodiment of the invention shown in FIG. 2, the mechanical control device 50 is first operated to cause the armatures 49, 44, 46 to engage the first contact positions of the respective switches 48, 45, 47. An electrical path is completed from ground to the positive terminal of a source of potential including armature 49 and the first contact position of switch 48, lead 106, input windings 107, 108 on magnetic core 92 of the second shift register 15, lead 109 and input windings 110, 111 on the magnetic core 52 of the first shift register 12. The voltage induced in the input windings 107, 108 causes magnetic core 92 to assume an active state having a "one" stored therein. In the same manner, the voltage induced in the input windings 110, 111 causes the magnetic core 52 to assume an active state having a "one" stored therein. A "one" is thus inserted in both the first shift register 12 and in the second shift register 15.

It is possible that a "one" may be stored at this time in other magnetic cores of the respective shift registers 12, 15. This situation may arise, for example, as the result of the previous operation of the timing circuit or may be due to the fact that a magnetic core was made to assume an active state prior to or during the installation thereof in one of the shift registers 12, 15. As will become apparent, the proper operation of the timing circuit requires that only a single "one" be advanced through the respective shift registers 12, 15. In accordance with the invention, therefore, the switching circuit 11 is operated to clear all the information out of the respective shift registers 12, 15 prior to the regular operation of the timing circuit. The mechanical control device 50 is operated to cause the armatures 49, 44, 46 to engage the second contact positions of the respective switches 48, 45, 47. An electrical path is completed from ground to one side of the advance connection 117 completed between the output winding 118 on magnetic core 94 and the input winding 119 on the magnetic core 95 of the shift register 15 including armature 49 and the second contact position of switch 48 and lead 120. The other side of the advance connection 117 is normally connected to ground.

A further electrical path is completed from the input terminal 43 to the control grid of a triode vacuum tube 121 in the gating circuit 99 including armature 46 and the second contact position of switch 47, lead 122 and coupling capacitor 123. A still further electrical path is completed from the input terminal 42 to the control grid of a second triode vacuum tube 124 in the gating circuit 99 including armature 44 and the second contact position of switch 45, lead 125 and coupling capacitor 126. The square wave 40, is, therefore, applied to the control grid of tube 124, while the square wave 41 is applied to the control grid of tube 121. The two tubes 121, 124 in the gating circuit 99 are each normally biased beyond cutoff. It will be remembered that the square waves 40, 41 are of the same frequency and are one hundred and eighty degrees out of phase with each other. During the positive half cycle of square wave 41 tube 121 becomes conducting, while tube 124 becomes conducting during the positive half cycle of square wave 40. In other words, first one tube and then the other of the gating circuit 99 becomes conducting.

During the periods in which tube 121 is conducting current is caused to flow over lead 127 and through the primary winding 128 of a magnetic core transformer 129 included in the plate circuit of a triode vacuum tube 130. Tube 130 is included in the blocking oscillator circuit 100. A positive voltage is induced in the secondary winding 131 of transformer 129 which is applied to the control grid of tube 130, raising the potential of the control grid to a level such that tube 130 conducts. As the current through the primary winding 128 increases, the positive voltage applied to the control grid of tube 130 also increases until a point of saturation is reached. The current through the primary winding 128 stops increasing, and a positive voltage is no longer induced across the secondary winding 131. A charge on capacitor 132, built up during the time that voltage was being induced in the secondary winding 131, leaks off onto the control grid of tube 130. Tube 130 continues to conduct until the control grid goes negative with respect to the cathode. A sharp, positive pulse of a duration determined by the value of capacitor 132 is produced which is applied over lead 134 from the control grid of tube 130 to the control grid of a triode vacuum tube 133 in the driving circuit 101. Tube 133 becomes conducting. The pulse applied to the control grid of tube 133 is amplified, and appears as a negative shift current pulse in the plate circuit of tube 133.

When tube 124 becomes conducting, current is caused to flow over lead 135 and through the primary winding 136 of a magnetic core transformer 137 included in the plate circuit of a triode vacuum tube 138. Tube 138 is included in the blocking oscillator circuit 100 and functions in the same manner as tube 130 .A positive voltage is induced in the secondary winding 139 of transformer 137 which is applied to the control grid of tube 138. A charge built up on capacitor 140 during the period in which voltage is induced in the secondary winding 139, thereafter leaks off onto the control grid of tube 138. A pulse, whose duration is determined largely by the transformer magnetizing inductance and to a smaller degree by the value of capacitor 140 is applied over lead 142 from the control grid of tube 138 to the control grid of a triode vacuum tube 141 in the driving circuit 101. Tube 141 becomes conducting. The pulse applied to the control grid of tube 141 is amplified, and a negative shift current pulse appears in the plate circuit of tube 141.

The gating circuit 99, blocking oscillator circuit 100 and driving circuit 101 in the driving unit 17 continue to operate in the manner described in response to the square waves 40, 41 applied thereto from the terminals 42, 43 by the operation of the switches 45, 47, respectively, in the switching circuit 11. A first series of shift current pulses appears in the plate circuit of tube 133, while a second series of shift current pulses appears in the plate circuit of tube 141. The two series of shift current pulses are of the same frequency, but are one hundred and eighty degrees out of phase with each other. The first series of shift current pulses is applied over a lead 143 to the shift winding 81 on magnetic core 51 and to the shift windings 145 through 157 on magnetic cores 53, 55, 57, 59, 61, 63, 65, 67, 69, 71, 73, 75 and 77, respectively. It will be remembered that these odd-numbered magnetic cores constitute the line of storage cores in the shift register 12. The second series of shift current pulses is applied over a lead 158 to the shift winding 86 on magnetic core 52 and to the shift windings 159 through 171 on the magnetic cores 54, 56, 58, 60, 62, 64, 66, 68, 70, 72, 74, 76 and 78, respectively. The latter magnetic cores constitute the line of temporary storage cores in the shift register 12.

Because of the out-of-phase relationship of the shift current pulses applied to the shift windings on the magnetic cores in the line of storage cores as compared to the shift current pulses applied to the shift windings on the magnetic cores in the line of temporary storage cores, the "one" stored in the magnetic core 52 by the operation of switch 48 in the switching circuit 11 will be advanced out of the temporary storage core 52 and into the storage core 53, out of the storage core 53 and into the temporary storage core 54 and so on along the chain of magnetic cores in the shift register 12. Any "ones" stored in other magnetic cores will be advanced along the chain of magnetic cores in the shift register 12 in a similar manner. The shift register 12 is connected as a closed loop shift register. When a "one" is advanced out of the magnetic core 74, a voltage is induced in output windings 172, 173. Current flows over an electrical path including a rectifier 174, an integrating circuit comprising capacitor 223, resistor 226 and a bias circuit comprising capacitor 224, resistors 225 and 227. The voltage developed across the integrator is applied to a terminal 175 of a terminal board 176. When a "one" is advanced out of the last magnetic core 78, a voltage is induced in the output windings 178, 179. Current flows over an electrical path including rectifier 177, an integrating circuit comprising capacitor 228, resistor 229 and the bias circuit comprising capacitor 224, resistors 225 and 227. The voltage developed across the integrator is applied to a terminal 180 of the terminal board 176. It will be assumed for the moment that a jumper connection 181 is completed between the terminal 180 and an output terminal 182 of the terminal board 176.

When a "one" is advanced out of the magnetic core 78, a positive pulse is produced which is applied to the control grid of a triode vacuum tube 183 over an electrical path including terminal 180, jumper connection 181, terminal 182, lead 184 and a coupling capacitor 185. Tube 183 functions as a gate and is normally biased beyond cut off. When a positive pulse is applied to the control grid of tube 183, tube 183 conducts. A negative pulse is applied from the plate of tube 183 to the input windings 79, 80 on the first magnetic core 51 in the shift register 12 over lead 186. The voltage induced in the input windings 79, 80 causes the magnetic core 51 to assume an active state having a "one" stored therein. The "one" stored in the magnetic core 51 is advanced core-by-core through the shift register 12 in the manner described above. When the "one" is advanced out of the last magnetic core 78, a negative pulse is again applied to the input windings 79, 80 on the magnetic core 51 and so on. By the use of the feed back arrangement, a closed loop shift register is provided such that a one originally stored in one of the magnetic cores is continuously circulated through the shift register 12.

Reference has been made to the bias circuit comprising capacitor 224 and resistors 225, 227. When the "zero" is stored in the magnetic cores 74, 78 and a shift current pulse is applied thereto, the output of the magnetic cores 74, 78 is not zero and is considered noise and undesirable. The network comprising capacitor 224, resistors 225, 227 provides a threshold D.C. bias which, in effect, back biases the diodes 174, 177 and clamps out the undesirable signal so produced.

An electrical path is completed from ground to the cathodes of two triode vacuum tubes 191, 192 arranged in the bistable multivibrator 102 including the output windings 187, 188 on magnetic core 73, rectifier 189, lead 190 and a coupling capacitor 193. The bistable multivibrator 102 is of conventional design and is capable of assuming one of two states of stable equilibrium. In one stable state tube 191 is conducting, and tube 192 is cut off. In the second stable state tube 191 is cut off, and tube 192 is conducting. Each time a "one" is advanced out of the magnetic core 73, a pulse is applied to the cathodes of tubes 191, 192. The electrical path is completed through the output windings 187, 188 and the rectifier 189 is poled in the proper direction such that a negative pulse is applied to the cathodes of tubes 191, 192. The bistable multivibrator 102 assumes first one and then the other stable state in response to successive negative pulses applied thereto by the operation of the magnetic core 73 and functions, in effect, to divide by a factor of two the frequency of the pulses applied thereto from the magnetic core 73. When the bistable multivibrator 102 assumes the stable state in which tube 192 is conducting and tube 191 is cut off, a positive pulse is applied from the plate of tube 191 to the control grid of a triode vacuum tube 194 in the gating circuit 103 over an electrical path including lead 195 and coupling capacitor 196. Tube 194, which is normally biased beyond cut off, conducts, and a negative pulse is applied over lead 198 from the plate of tube 194 to the plate circuit of a triode vacuum tube 197 in the blocking oscillator circuit 104. The blocking oscillator circuit 104 is of the same construction and operation as the blocking oscillator circuit 100 in the driving unit 17 previously described. Tube 197 conducts, and a sharp positive pulse is applied over lead 200 from the control grid of tube 197 to the control grid of a triode vacuum tube 199 in the driving circuit 105. The sharp positive pulse is amplified by the conduction of tube 199 and appears as a negative shift current pulse at the plate of tube 199.

The next negative pulse applied to the bistable multivibrator 102 from the magnetic core 73 causes the bistable multivibrator to assume its second stable state in which tube 191 is conducting and tube 192 is cut off. A positive pulse is applied from the plate of tube 192 to the control grid of a triode vacuum tube 201 in the gating circuit 103 over an electrical path including lead 202 and coupling capacitor 203. Tube 201, which is normally biased beyond cut off, conducts and a negative pulse is applied over lead 204 from the plate of tube 201 to the plate circuit of a triode vacuum tube 205 in the blocking oscillator circuit 104. Tube 205 is operated in the same manner as the tube 197 also included in the blocking oscillator circuit 104 and a sharp positive pulse is applied over lead 230 from the control grid of tube 205 to the control grid of a triode vacuum tube 206 in the driving circuit 105. The sharp positive pulse is amplified by the conduction of tube 206 and appears as a negative shift current pulse at the plate of tube 206. The bistable multivibrator 102, gating circuit 103, blocking oscillator circuit 104 and driving circuit 105 included in the driving unit 26 continue to operate in the above manner in response to successive negative pulses applied to the bistable multivibrator 102 from the magnetic core 73 in the shift register 12. A series of shift current pulses appears at the plate of tube 199, while a second series of shift current pulses appears at plate of tube 206. The shift current pulses appearing at the plate of tube 199 will be one hundred and eightly degrees out of phase as compared to the shift current pulses appearing at the plate of tube 206.

The series of shift current pulses appearing at the plate of tube 206 are applied over lead 207 to the shift windings 208 through 211 on the magnetic cores 92, 94, 96, 98, respectively. The series of shift current pulses appearing at the plate of tube 199 are applied over lead 212 to the shift windings 213 through 216 on the magnetic cores 91, 93, 95, 97, respectively. The shift current pulses appearing at the plate of tube 206 are, therefore, applied to the line of temporary storage cores, while the shift current pulses appearing at the plate of tube 199 are applied to the line of storage cores in the shift register 15. The "one" stored in the magnetic core 92 by the previous operation of switch 48 in the switching circuit 11, as well as a "one" which may be stored in the magnetic cores 91, 93, 94 are advanced core-by-core through the shift register 15. It will be remembered that a ground connection is at this time completed to the advance connection 117 between the magnetic core 94 and the magnetic core 95 by causing the armature 49 to engage the second contact position of switch 48. As a "one" is advanced out of the magnetic core 94, it is passed to ground over the ground connection completed to the advance connection 117 instead of being advanced into the magnetic core 95.

The shift register 15 is connected as a closed loop shift register. The output winding 217 on the last magnetic core 98 is coupled by an advance connection 218 including rectifier 219 to the input winding 220 on the first magnetic core 91. A "one" stored in any of the magnetic cores 95 through 98 is advanced core-by-core through the shift 15 and is eventually passed to ground over the ground connection completed to the advance winding 117. In this manner, all of the information in the form of "ones" are cleared out of the shift register 15 and the magnetic cores 91 through 98 each assume an inactive state having a "zero" stored therein.

After a delay sufficient to permit the above described action to take place, the mechanical control device 50 is operated to cause the armatures 49, 44, 46 to engage the third contact positions on the switches 48, 45, 47, respectively, in the switching circuit 11. The ground connection completed to the advance connection 117 is removed, and a ground connection is completed to one side of the advance connection 221 between the magnetic core 64 and the magnetic core 65 in the shift register 12. The ground connection is completed over an electrical path including armature 49 and the third contact position of switch 48 and lead 222. The other side of the advance connection 221 is normally connected to ground, as shown. At the same time, the square wave 40 is applied from terminal 42 to the control grid of tube 124 over the electrical path including armature 44 and the third contact position of switch 45, lead 125 and coupling capacitor 126. The square wave 41 is applied to the control grid of tube 121 over the electrical path including armature 46 and the third contact position of switch 47, lead 122 and the coupling capacitor 123. The gating circuit 99, blocking oscillator circuit 100 and the driving circuit 101 in the driving unit 17 function in the manner already described to produce two series of shift current pulses which are selectively applied over the respective leads 143, 158 to the shift windings on the magnetic cores 51 through 78 in the shift register 12. Each "one" stored in a magnetic core is advanced core-by-core through the shift register 12, and is passed to ground over the ground connection completed to the advance connection 221. A "one" stored in one of the magnetic cores 65 through 78 is advanced out of the last magnetic core 78 and is fed back to the first magnetic core 51 over the loop circuit previously described such that it is eventually passed to ground over the ground connection completed to the advance connection 221. All of the information in the form of "ones" is cleared out of the shift register 12, and the magnetic cores 51 through 78 each assume an inactive state having a "zero" stored therein. At this time, therefore, a "zero" is stored in each of the magnetic cores 51 through 78 in the first shift register 12 and in each of the magnetic cores 91 through 98 in the second shift register 15.

The mechanical control device 50 is operated after a sufficient delay to cause the armatures 49, 44, 46 to engage the fourth contact positions of the switches 48, 45, 47, respectively. The ground connection completed to the advance connection 221 over lead 222 is removed. The fourth contact position on each of the switches 48, 45, 47 are open and function as safety positions. No action occurs at this time ensuring that the operations described above are completed before proceeding with the next step. Armatures 49, 44, 46 are thereafter operated by the mechanical control devices 50 to engage the fifth contact positions of the switches 48, 45, 47, respectively. The fifth contact position of the switch 48 is connected to the first contact position thereof, and the electrical connection is completed from ground to the positive terminal of a source of potential including armature 49 and the fifth contact position of switch 48, lead 106, the input windings 107, 108 on the magnetic core 92 in the shift register 15, lead 109 and the input windings 110, 111 on the magnetic core 52 in the shift register 12. The voltage induced in the input windings 110, 111 on the magnetic core 52 causes the magnetic core 52 to assume an active state having a "one" stored therein. Similarly, the voltage induced in the input windings 107, 108 on the magnetic core 92 causes the magnetic core 92 to assume an active state having a "one" stored therein. A single "one" is, therefore, stored in the first shift register 12 and in the second shift register 15.

The mechanical control device 50 is then operated to cause the armatures 49, 44, 46 to engage the sixth contact positions on the switches 48, 45, 47, respectively. As the sixth contact position on each of the switches 48, 45, 47 is open, no action results. Armatures 49, 44, 46 are operated to engage the seventh contact positions of the switches 48, 45, 47, respectively. The square wave 40 is applied from the terminal 42 to the control grid of tube 124 over an electrical path including armature 44 and the seventh contact position of switch 45, lead 125 and coupling capacitor 126. The square wave 41 is applied from the terminal 43 to the control grid of tube 121 over an electrical path including armature 46 and the seventh contact position of switch 47, lead 122 and coupling capacitor 123. The gating circuit 99, blocking oscillator circuit 100 and driving circuit 101 in the driving unit 17 operate in the manner described to selectively apply shift current pulses over the respective leads 158, 143 to the shift windings on the magnetic cores 51 through 78 in the shift register 12. The "ones" stored in the magnetic core 52 is advanced core-by-core such that a single "one" is continuously circulated through the shift register 12.

Each time the "one" is advanced out of the magnetic core 53, a voltage is induced in the output windings 237, 238. A positive output pulse is applied from magnetic core 53 across a load resistor 239 over an electrical path including rectifier 240, lead 241, lead 242 and an integrating circuit 247 comprising capacitor 243 and resistor 245. The integrating circuit 247 functions to widen the pulse, and a positive voltage or timing signal developed across the integrator 247 is applied over lead 248 to an output terminal 249. The bias circuit comprising resistors 246, 239 and capacitor 244 functions to prevent the application of noise to the terminal 249 in the absence of a timing signal applied to the terminal 249. In the same manner each time the "one" is advanced out of the succeeding magnetic cores 55, 57, 59, 61, 63, 65, 67, 69 and 71 in the line of storage cores an output pulse appears across the load resistor 239 over the electrical path including lead 241, lead 242 and the integrating circuit 247. A timing signal is produced for each positive output pulse and is applied over lead 248 to the output terminal 249. Each time the "one" is advanced out of the magnetic cores 54, 56, 58, 60, 62, 64, 66, 68 and 70 in the line of temporary storage cores a positive output pulse appears across the integrator 247 over an electrical path including lead 250 and lead 251 including separate rectifiers poled in the proper direction. A timing signal is applied over lead 248 to output terminal 249 for each positive output pulse produced by the operation of the magnetic cores 54, 56, 58, 60, 62, 64, 66, 68 and 70. In other words a train of timing signals appears at the output terminal 249 corresponding to the positive output pulses sequentially produced by the successive operation of the magnetic cores 53 through 71.

Each time the "one" is advanced out of the magnetic core 72 a positive output pulse appears across the integrator comprising capacitor 254 and resistor 256 over an electrical path including lead 253 and rectifier 290. A timing signal is produced which is applied over lead 258 to an output terminal 259. A bias circuit comprising capacitor 255 and resistors 257, 252 prevents the application of noise to the terminal 259 in the absence of a timing signal applied to the terminal 259. In the arrangement shown in FIG. 2, therefore, a train of nineteen timing signals appears repetitiously at the output terminal 249, while a single timing signal appears repetitiously at the output terminal 259. The particular manner in which the timing signals are made to appear at the output terminals 249, 259 in the circuit arrangement shown in FIG. 2 is, of course, given only by way of example. Only one output terminal may be provided to which a single timing signal is applied by the operation of one of the magnetic cores 51 through 78 in the shift register 12. On the other hand, a timing signal may be produced by the operation of each of the magnetic cores 51 through 78, the timing signals being applied to different output terminals such that a different one of the timing signals appears at the respective output terminals. In the arrangement shown in FIG. 2, the train of nineteen timing signals instead of being applied to the output terminal 249 may be divided into a number of trains of timing signals for application to separate output terminals. The particular manner in which the timing signals are made available will depend on the requirements of the utilization circuit to which the timing signals are applied from the output terminals of the timing circuit.

As already described, each time the "one" is advanced out of the magnetic core 73 in the shift register 12, a negative output pulse is applied to the bistable multivibrator 102 in the driving unit 26 over the electrical path including rectifier 189, lead 190 and coupling capacitor 193. In actual practice, the output pulse applied to the bistable multivibrator 102 could result from the operation of any one of the magnetic cores 51 through 78 in the shift register 12, depending, of course, upon the additional functions which the various magnetic cores were required to perform. The bistable multivibrator 102, gating circuit 103, blocking oscillator circuit 104 and driving circuit 105 in the driving unit 26 operate in the manner described to selectively apply shift current pulses over the respective leads 207, 212 to the shift windings on the magnetic cores 91 through 98 in the second shift register 15. The "one" stored in the magnetic core 92 by the operation of switch 48 is advanced core-by-core such that a single "one" continuously circulates through the shift register 15. As in the case of the first shift register 12, the manner in which the second shift register 15 is operated to produce timing signals depends upon the requirements of the utilization circuit connected to the timing circuit. In the embodiment shown in FIG. 2, each of the magnetic cores 91, 93 through 98 is operated to produce a negative output pulse which is applied over an electrical path to one of the output terminals 265 through 271. Thus, each time the "one" is advanced out of the magnetic core 91 a negative output pulse is developed across an integrator over an electrical path including output windings 273, 274, lead 275, rectifier 276, an integrating circuit comprising capacitor 277 and resistor 279, and the bias circuit comprising capacitor 278 and resistors 272, 280. The voltage developed across the integrator is applied as a timing signal over lead 281 to output terminal 265. When the "one" is advanced out of the magnetic core 93 a negative output pulse is developed across an integrator over an electrical path including output windings 282, 283, lead 284, rectifier 285 and an integrating circuit comprising capacitor 286 and resistor 287. The voltage developed across the integrator is applied over lead 288 to output terminal 266 and so on. A single timing signal produced by the operation of one of the respective magnetic cores 91, 93 through 98 appears at the different output terminals 265 through 271. In actual practice, the timing signals may be made available at different output terminals in any manner desired. The timing signals may be made available in trains or selected ones of the timing signals may be made available individually at separate output terminals and so on.

The operation of the timing circuit in response to square waves 40, 41 of a particular frequency will now be described to assist in an understanding of the invention. The frequency of the square waves 40, 41 is, of course, determined according to the requirements of a utilization circuit to which timing signals are to be applied from the timing circuit. Assuming that 2.4 kc. (kilocycle) square waves which are one hundred and eighty degrees out of phase with each other are applied to the respective input terminals 40, 41. Since the repetition rates of the two series of shift current pulses applied over leads 143, 158, respectively, are each 2.4 kc. the single "one" is advanced from core to core through the shift register 12 at a 4.8 kc. rate. The shift register 12 may be designed to produce timing signals for use with equipment included in an American 42$\frac{6}{7}$ cycle telegraph communication system or for use with equipment included in a European 50 cycle telegraph communication system. Reference has previously been made to the manner in which an output pulse produced by the operation of magnetic core 74 is applied to terminal 175 of terminal board 176, while an output pulse produced by the operation of magnetic core 78 is applied to the terminal 180 of the terminal board 176. If the timing circuit is to be used with a 50 cycle system, the jumper connection 181 is completed between terminal 175 and the output terminal 182 of the terminal board 176. If, on the other hand, the timing circuit is to be used with a 42$\frac{6}{7}$ cycle system, the jumper connection 181 is completed between terminal 180 and the terminal 182. Assuming that the connection 181 is completed between terminal 180 and terminal 182, the time between the appearance of each timing signal produced by the operation of one of the magnetic cores 51 through 78 is 5.83 milliseconds. Thus, the timing signals produced by the repeated operation of a single magnetic core 53 are 5.83 milliseconds apart and so on.

The time between consecutive timing signals produced by the operation of succeeding magnetic cores in the chain of magnetic cores 51 through 78 is 208 microseconds. Thus, each timing signal produced by the operation of magnetic core 54 appears 208 microseconds after each timing signal produced by the operation of magnetic core 53 and so on. The gating output pulses produced by the operation of magnetic core 73, occurring at a 171$\frac{3}{7}$ cycles per second repetition rate, are applied over lead 190 to the bistable multivibrator 102. Two 85$\frac{5}{7}$ cycles per second square waves which are one hundred and eighty degrees out of phase with each other are produced. Since the repetition rates of the two series of shift current pulses applied over leads 207, 212, respectively, are each 85$\frac{5}{7}$ cycles per second, the single "one" is advanced from core to core through the shift register 15 at a 171$\frac{3}{7}$ cycles per second rate. Assuming that the shift register 15 includes a chain of twenty-eight magnetic cores, the time between consecutive timing signals produced by the operation of succeeding magnetic cores in the chain is 5.83 milliseconds. Thus, each timing signal produced by the operation of magnetic core 94 occurs 5.83 milliseconds after each timing signal produced by the operation of magnetic core 93 and so on. The time between the occurrence of each timing signal produced by the operation of a single one of the magnetic cores in the chain is 163 milliseconds. Thus, the timing signals produced by the operation of magnetic core 93 are spaced 163 milliseconds apart and so on.

When it is desired to operate the timing with a 50 cycles per second system, the jumper connection 181 is completed between the terminal 175 and terminal 182 of the terminal board 176. Since the shift current pulses are still at a 2.4 kc. repetition rate, the single "one" is advanced from core to core through the shift register 12 at a 4.8 kc. rate. The time between timing signals produced by the operation of succeeding magnetic cores is still 208 microseconds. The time between timing signals produced by operation of a single one of the magnetic cores is now 5 milliseconds. The output pulses produced by the operation of magnetic core 73 are now at a 200 cycles per second repetition rate, and the bistable multivibrator 102 produces two 100 cycles per second square waves one hundred and eighty degrees out of phase with each other. The single "one" is advanced from core to core through the shift register 15 at a 200 cycles per second rate. The time between timing signals produced by the operation of succeeding magnetic cores is 5 milliseconds, and the time between timing signals produced by the operation of a single one of the magnetic cores is 140 milliseconds. The frequency of the square waves 40, 41 can be altered to meet a particular application of the timing circuit, the manner in which the timing signals are made available over separate circuits at different output terminals of the timing circuit being determined according to the requirements of an utilization circuit to which the timing signals are applied via the output terminals.

It may be desirable in certain applications to operate the shift register 15 synchronously with other equipment. If such operation is desired, the timing circuit may be modified in the manner shown in FIG. 3. When the "one" is advanced out of the last magnetic core 98, voltage induced in the output windings 293, 294 causes a negative output pulse to be applied over an electrical path including lead 295, rectifier 296, resistor 297, the primary winding 298 of a magnetic core transformer 299, a bias circuit comprising capacitor 300 and resistor 301 and resistor 302. At the same time a negative timing signal is developed across an integrating circuit and applied to output terminal 271 in the manner already described. The voltage induced in the secondary winding 303 of transformer 299 causes a positive pulse to be applied to the control grid of a triode vacuum tube 304 over an electrical path including lead 305, contact 306 and armature 307 of a switch 308 and coupling capacitor 309. Tube 304 operates as a gate and is normally biased beyond cut-off. Upon the reception of the positive pulse, tube 304 conducts. A negative pulse is applied from the plate of tube 304 to the positive terminal of a source of potential over an electrical path including lead 310 and input windings 273, 274 on the magnetic core 91. The voltage induced in the input windings 273, 274 causes magnetic core 91 to assume an active state having a "one" stored therein. The "one" advanced out of magnetic core 98 is thus read into the magnetic core 91. The shift register 15 is, therefore, still a closed loop shift register and is operated in all other respects as previously described such that a single "one" is continuously circulated therethrough.

When it is desired to synchronize the operation of the shift register 15 with the operation of other equipment, armature 307 of switch 308 is made to disengage contact 306 and to engage contact 311. The shift register 15 is no longer a closed loop shift register. When the "one" is advanced out of the last magnetic core 98, it is now terminated across an end resistor 312. Instead of feeding the "one" back to the input core 91, a control pulse is supplied from associated equipment, for example, a second timing circuit, to the input terminal 313. The control pulse is applied to the control grid of tube 304, and tube 304 conducts. The negative voltage induced in the input windings 273, 274 causes a "one" to be read into the magnetic core 91. The "one" is advanced from core to core through the shift register 15 in the manner previously described. To ensure that a shift current pulse is not applied to the shift windings 213 through 216 at the same time that the "one" is read into the magnetic core 91, a negative voltage is applied to the cathode circuit of tube 191 over an electrical path including lead 314, rectifier 315, resistor 316 and capacitor 317. The bistable multivibrator 102 is held in the stable state in which tube 191 is conducting and tube 192 is cut off until after the "one" has been read into the magnetic core 91. The actual operation of the shift register 15 is the same whether it be connected as a closed loop shift register or not. However, when armature 307 is made to engage contact 311 of switch 308, instead of a single "one" being continuously circulated through the shift register 15, each full cycle of operation of the shift register 15 is begun by the application of the control pulse from the second timing circuit to input terminal 313. The operation of the shift register 15 is, therefore, synchronized with that of the second timing circuit. The timing signals available at the different output terminals 266 through 271 connected to the shift register 15 will bear the same time relationship to the timing signals available at the output terminals 249, 259 connected to the shift register 12. By synchronizing the operation of the shift register 15, the timing signals available at the different output terminals 266 through 271 will also bear a desired time relationship to the timing signals produced by the operation of the second timing circuit.

A functional block diagram of a telegraph communication system in which the timing circuit of the invention may find application is shown in FIG. 4. The telegraph communication system shown is an automatic error correction system. The communication system includes at least two stations 1 and 2 which are electrically connected together over different electrical paths 323, 324 for two way communication. Code characters are produced by the operation of a telegraph transmitter 325 at the first station 1 for transmission over a channel A to a transmitter unit 326. Code characters are also produced by the operation of a second telegraph transmitter 327 for transmission over a second channel B to the transmitter unit 326. Each code character transmitted over channel A and over channel B includes five signal elements arranged according to the fixed-length five-unit telegraph code. Each character in the code includes five signal elements, the respective signal elements being marking or spacing in nature. A character may include five marking elements, five spacing elements or a combination of marking and spacing elements arranged in a predetermined manner.

In the transmission of a five-unit code character over a communication system, the code character may be distorted. Spacing elements may be filled in by noise to form marking elements, and marking elements may be deleted by atmospheric conditions to form spacing elements. Because the ratio or marking elements to spacing elements is different in each code character of the five-unit telegraph code, it is difficult to design equipment which can automatically function to detect a distorted code character and, thereafter, place the necesary correction equipment in operation. Various protected telegraph codes have been devised to avoid this difficulty. For example, each code character in the seven-unit protected telegraph code includes three marking elements and four spacing elements. By counting the number of marking elements in each code character received over a communication system, a character which has been distorted such that it includes more or less than three marking elements can be readily determined.

In the communication system shown in the block diagram given in FIG. 4, the five-unit code characters transmitted over the channels A, B are received in order by the transmitter unit 326 and are applied, in turn, from the transmitter unit 326 to a transmitter control unit 328 over lead 329. The transmitter control unit 328 functions to convert the five-unit code characters into seven-unit code characters. The converted code characters are thereafter applied from the transmitter control unit 328 back to the transmitter unit 326 over lead 330. The transmitter unit 326 is operated to transmit the converted code characters appearing over channels A, B over the electrical path 323, to the receiver unit 336 at the second station 2 in multiplex fashion. As the code characters are transmitted over the electrical path 323, equipment is provided in the transmitter unit 326 for storing on a continuous basis the last three code characters transmitted over channel A and the last three code characters transmitted over channel B.

In order to accomplish the transmission of the code characters over channels A, B, the transmitter unit 326 and transmitter control unit 328 must operate in a predetermined time sequence. Thus, the code characters are first received in order over the channels A, B by the transmitter unit 326. The code characters are then applied, in turn, to the transmitter control unit 328. The transmitter control unit 328 operates to convert the code characters and to apply the converted code characters back to the transmitter unit 326. The transmitter unit 326 thereafter operates to transmit the converted code characters in multiplex fashion over the electrical path 323. A transmitter timing unit 331 constructed according to the invention is operated in response to signal energy of a predetermined frequency applied to the transmitter timing unit 331 from a frequency standard unit 332 over lead 333. The transmitter timing 331 operates to produce timing signals of a predetermined frequency which are applied in a given order over leads represented by lead 334 to the transmitter unit 326 and over leads represented by lead 335 to the transmitter control unit 328. The transmitter unit 326 and transmitter control unit 328 operate in response to the timing signals to perform the functions outlined above.

The multiplex signal transmitted over the electrical path 323, which may include, for example, a radio frequency transmission system, is received by the receiver unit 336 located at the second station 2. The seven-unit code characters are applied, in turn, from the receiver unit 336 to a receiver control unit 337 over lead 338. The receiver control unit 337 converts the seven-unit code characters into five-unit code characters. Equipment is included in the receiver control unit 337 for counting the number of marking elements in each seven-unit code character received. It will be assumed for the moment that all the code characters are properly received without idstortion. The converted, five-unit code characters are applied from the receiver control unit 337 back to the receiver unit 336 over lead 339. The receiver unit 336 functions to distribute the code characters transmitted over channel A to a first telepraph printer 340 and the code characters transmitted over channel B to a second telegraph printer 341.

The timing of the receiver unit 336 and of the receiver control unit 337 is controlled by a receiver timing unit 342 constructed according to the invention. Signal energy is applied from a frequency standard unit 343 to a frequency correction unit 344 over lead 345. The receiver unit 336 includes equipment for producing a train of control signals of a frequency corresponding to the frequency of the signal elements included in the multiplex signal received by the receiver unit 336 over the electrical path 323. The train of control signals is applied over lead 346 to the frequency correction unit 344. Timing signals produced by the receiver timing unit 342 are also applied to the frequency correction unit 344 over a lead 347. The frequency correction unit 344 compares the frequency of the control signals received over lead 346 with the frequency of the timing signals received over lead 347. If the control signals are early compared to the timing signals, the frequency of the signal energy applied from the frequency correction unit 344 to the receiver timing unit 342 over lead 348 is adjusted so that the timing signals produced by the operation of the receiver timing unit 342 are advanced. If the control signals are late, the timing signals are retarded. Timing signals of the proper frequency and in a given order are applied from the receiver timing unit 342 to the receiver control unit 337 over leads represented by lead 349 and to the receiver unit 336 over leads represented by lead 350. Interconnections represented by lead 351 are completed between the receiver control unit 337 and the frequency correction unit 344. Timing signals produced by the operation of the receiver control unit 337 are applied over lead 351 to the frequency correction unit 344, while timing signals produced by the operation of the frequency correction unit 344 are applied over lead 351 to the receiver control unit 337. The receiver unit 336 and the receiver control unit 337 are operated in the proper time sequence in response to the timing signals applied thereto to perform the functions outlined above.

While the above description has been directed to the equipment used to complete the transmission of code characters from the first station 1 to the second station 2, the description applies equally well, with one exception, to the equipment used to complete the transmission of code characters from the second station 2 to the first station 1. For ease of description, the corresponding equipment used to complete the transmission of message signals between the two stations 1 and 2 in the different directions has been identified by the same reference numerals, the reference numerals identifying the equipment used to complete the transmission of message signals from station 2 to station 1 being hyphenated. Code characters produced by the operation of the telegraph transmitters 325', 327' are transmitted over the respective channels A', B' to the transmitter unit 326'. The five-unit code characters are converted into seven-unit code characters by the transmitter control unit 328'. The converted code characters are then transmitted by the operation of the transmitter unit 326' in multiplex fashion over the electrical path 324, the transmitter unit 326' including equipment for storing on a continuous basis the last three code characters transmitted over channel A' and the last three code characters transmitted over channel B'. The multiplex signal is received by the receiver unit 336' and the seven-unit code characters converted into five-unit code characters by the receiver control unit 337'. The converted code characters are then distributed in the proper manner over the channels A', B' to the telegraph printers 340', 341', respectively.

Up to this point, it has been assumed that the code characters in the respective multiplex signals transmitted over the electrical paths 323, 324 are received by the receiver units 336, 336', respectively, without distortion. The operation of the stations 1, 2 without the provision for error correction to be described would be similar to that which would occur in any simple two way communication system. If one of the code characters transmitted over channel A and received by the receiver unit 336 at the second station 2 is detected by the receiver control unit 337 as a distorted character (a code character including more or less than three marking elements), a control signal is applied from the receiver control unit 337 to the receiver unit 336 over lead 339. The receiver unit 336 goes into cycling in response to the control signal, halting the further distribution of the code characters transmitted over channel A to the telegraph printer 340. At the same time a control signal is applied from the receiver unit 336 to the transmitter unit 326' over lead 352. The transmitter unit 326' interrupts the transmission of the code characters transmitted over channel A' by the operation of the telegraph transmitter 325' and proceeds to transmit a repetition request signal plus the last three code characters transmitted over channel A' and stored by equipment in the transmitter unit 326'. The repetition request signal is detected by the receiver control unit 337', and a control signal is applied from the receiver control unit 337' to the receiver unit 336' over lead 339'. The receiver unit 336' goes into cycling and prevents the distribution of the repeated code characters transmitted over channel A' to the telegraph printer 340'. At the same time a control signal is applied from the receiver unit 336' to the transmitter unit 326 over lead 353. The transmitter unit 326 operates in response to the control signal to interrupt the transmission of the code characters produced by the telegraph transmitter 325 for transmission over channel A. The transmitter unit 326 proceeds to transmit a repetition request signal plus the last three code characters transmitted over channel A which were stored by equipment in the transmitter unit 326. The loop time delay of the error correction system is such that the code character received distorted by the receiver unit 336 is stored in the transmitter unit 326. If the code character previously received distorted is now received correctly by the receiver unit 336, the receiver unit 336 goes out of cycling. The communication system resumes its normal condition of operation in which code characters are transmitted from the telegraph transmitter 325 to the telegraph printer 340 over channel A and in which code characters are transmitted from the telegraph transmitter 325' to the telegraph printer 340' over channel A'. If, however, the code character is again received distorted, the above sequence of operations will continue until the code character is received correctly by the receiver unit 336.

The correction of the code character received distorted by the receiver unit 336 over channel A does not affect the transmission of the code characters from the telegraph transmitter 327 to the telegraph printer 341 over channel B and from the telegraph transmitter 327' to the telegraph printer 341' over channel B'. The transmission of the code characters over the channels B, B' proceeds in the normal manner. If a code character transmitted over channel B should be received distorted by the receiver unit 336, the receiver unit 336 goes into cycling. The distorted code character is not distributed to the telegraph printer 341, and a control signal is applied from the receiver unit 336 to the transmitter unit 326' over lead 354. The transmitter unit 326' interrupts the transmission of the code characters transmitted over channel B' by the telegraph transmitter 327' and proceeds to transmit over channel B' a repetition request signal plus the last three code characters transmitted over channel B', which were stored by equipment in the transmitter unit 326'. The receiver unit 336' prevents the distribution of the repeated code characters to the telegraph printer 341', and a control signal is applied from the receiver unit 336' to the transmitter unit 326 over lead 355. The transmitter unit 326 interrupts the transmission of the code characters transmitted over channel B by the telegraph transmitter 327 and proceeds to repeat the transmission of the last three code characters transmitted over channel B. When the code character previously received distorted is received correctly, the normal transmission of code characters from the telegraph transmitter 327 to the telegraph printer 341 over channel B and from the telegraph transmitter 327' to the telegraph printer 341' over channel B' resumes. The correction of the code character transmitted over channel B and received distorted by the receiver unit 336 does not affect either the transmission of code characters from the telegraph transmitter 325 to the telegraph printer 340 over channel A or the transmission of the code characters from the telegraph transmitter 325' to the telegraph printer 340' over channel A'. The correction of a code character received distorted over one of the channels A or B proceeds independently of the correction of a code character received distorted over the other channel. The correction of a code character received distorted over channel A and of a code character received distorted over channel B may proceed at the same time following the circuit operations outlined above.

The operation of the communication system in the reverse direction to correct code characters received distorted by the receiver unit 336' over channels A' or B' is exactly the same as when code characters are received distorted by the receiver unit 336 over channels A or B. If a code character is received distorted over channel A' or B', the transmitter unit 326' is operated to repeat the code character until it is correctly received by the receiver unit 336'.

An automatic error correction system of the type described requires that one station in the system be the master, while a second station in the system be the slave.

As shown in FIG. 4, the first station 1 is the master station in that the transmitter timing unit 331 is operated in response to signal energy applied thereto from the frequency standard unit 332 over lead 333. The second station 2 is the slave station in that the transmitter timing unit 331' is operated in response to signal energy applied thereto from the receiving timing unit 342 over lead 356. The stations 1, 2 in the automatic error correction system must be arranged for synchronous operation to ensure the proper operation of the correction loops. If the transmitting timing units 331, 331' were both operated in response to signal energy applied thereto from a frequency standard unit, a phase difference would exist which would vary by the amount that the two frequency standard units differed in frequency. By applying the signal energy from the receiving timing unit 342 to the transmitter timing unit 331', the operation of the receiver timing unit 342 being controlled by the frequency correction unit 344, a synchronously operated system is provided.

The timing circuit of the invention by using magnetic cores in the manner described to perform functions previously performed by electronic equipment is more compact and simpler in operation than the timing circuits known. Because of these features, the timing circuit of the invention is valuable and readily adaptable for use in controlling the sequential operation of equipment included in systems, for example, of the type described in connection with FIG. 4. While a single diplex or two channel multiplex telegraph communication system is shown in FIG. 4, the error correction system described above may be incorporated in other multiplex telegraph communication systems known in the art.

What is claimed is:

1. In combination, a plurality of shift registers each including a chain of magnetic cores, each of said magnetic cores being capable of operation in either one of two conditions, a switching circuit connected to all of said registers for determining the condition of operation of each of said magnetic cores, means for operating said switching circuit to place a single one of the magnetic cores in each of said registers in one of said conditions and to place the remaining magnetic cores in said registers in said other condition, said switching circuit successively operating on the magnetic cores in each of said registers to shift the condition placed in said single magnetic cores from magnetic core to magnetic core along each of said chains in said respective registers.

2. In combination, a plurality of shift registers each including a chain of magnetic cores, each of said magnetic cores being capable of operation in either one of two conditions, a switching circuit connected to all of said registers for determining the condition of operation of each of said magnetic cores, means for operating said switching circuit to place a single one of the magnetic cores in each of said registers in one of said conditions and to place the remaining magnetic cores in said registers in said other condition, said switching circuit including means for operating the magnetic cores in each of said registers in succession to shift the condition placed in said single magnetic cores from magnetic core to magnetic core along each of said chains in said respective registers, selected ones of said magnetic cores in each of said registers being arranged to produce an output pulse upon a change in the condition thereof, a plurality of output circuits each selectively connected to certain ones of said selected magnetic cores and responsive to each of said output pulses to produce a signal pulse, said selected magnetic cores each being connected to at least one of said output circuits, a separate output terminal connected to each of said output circuits, said output circuits each operating to apply the signal pulses produced by the operation thereof to the one of said terminals connected thereto.

3. A combination as defined in claim 2 and wherein said registers are connected as closed loop shift registers, the condition placed in said single magnetic cores and shifted from magnetic core to magnetic core along each of said chains being continually circulated through said respective registers.

4. A timing circuit comprising, in combination, a plurality of shift registers each including a chain of magnetic cores and connected as a closed loop shift register, each of said magnetic cores being capable of operation in either one of two conditions, a switching circuit connected to all of said registers for determining the condition of operation of each of said magnetic cores, means for operating said switching circuit to place a single one of the magnetic cores in each of said registers in one of said conditions and to place the remaining magnetic cores in said registers in said other condition, the magnetic cores in each of said registers being successively operated upon the operation of said switching circuit to shift the condition placed in said single magnetic cores from magnetic core to magnetic core along each of said chains in said respective registers, selected ones of said magnetic cores in each of said registers being arranged to produce a timing signal upon a change in the condition thereof, a plurality of output terminals each selectively connected to certain ones of said selected magnetic cores so that each selected magnetic core is connected to at least one of said terminals, said selected magnetic cores each operating to apply the timing signal produced by the operation thereof to the one of said terminals connected thereto.

5. In combination, a plurality of shift registers each including a chain of magnetic cores, each of said magnetic cores being capable of operation in either one of two conditions, a switching circuit connected to all of said registers for determining the condition of operation of each of said magnetic cores, means for operating said switching circuit to first place all of said magnetic cores in one of said conditions, said switching circuit being operated by said means to next place a single magnetic core in each of said registers in the second one of said conditions, the magnetic cores in each of said chains being successively operated upon a further operation of said switching circuit by said means to shift said second condition placed in said single magnetic cores from magnetic core to magnetic core along each of said chains in said respective registers, selected ones of the magnetic cores in each of said registers being arranged to produce an output pulse upon a change in the condition thereof, a plurality of output terminals each selectively connected to certain ones of said selected magnetic cores so that each selected magnetic core is connected to at least one of said terminals, said selected magnetic cores each operating to apply the output pulses produced by the operation thereof to the one of said terminals connected thereto.

6. A combination as defined in claim 5 and wherein said registers are each connected as closed loop shift registers, said second condition placed in said single magnetic cores and shifted from magnetic core to magnetic core along each of said chains being continually circulated through said respective shift registers.

7. A timing circuit comprising, in combination, a plurality of shift registers each including a chain of magnetic cores, each of said magnetic cores being capable of operation in either one of two conditions, a switching circuit connected to all of said registers for determining the condition of operation of each of said magnetic cores, means for operating said switching circuit to first place all of said magnetic cores in one of said conditions, said switching circuit being operated by said means to next place a single magnetic core in each of said registers in the second one of said conditions, the magnetic cores in each of said chains being successively operated upon a further operation of said switching circuit by said means to shift said second condition placed in said single magnetic cores from magnetic core to magnetic core along each of said chains in said respective registers, selected ones of said magnetic cores in each of said registers being arranged to produce an output pulse upon a change in the condition thereof, a plurality of output circuits each selectively connected to certain ones of said selected magnetic cores and responsive to each of said output pulses to produce a signal pulse of longer duration than that of said output pulse, said selected magnetic cores each being connected to at least one of said output circuits, a separate output terminal connected to each of said output circuits, said output circuits each operating to apply the signal pulses produced by the operation thereof to the one of said terminals connected thereto.

8. In combination, a shift register including a chain of magnetic cores, each of said magnetic cores being capable of operation in either one of two conditions, a switching circuit connected to said register for determining the condition of operation of each of said magnetic cores, a driving unit connected between said register and said switching circuit and responsive to the operation of said switching circuit to apply a series of current pulses to said magnetic cores, means for operating said switching circuit to first place all of said magnetic cores in one of said conditions, said switching circuit being operated by said means to next place a single one of said magnetic cores in the second one of said conditions, the magnetic cores being successively operated in response to said current pulses upon a further operation of said switching circuit by said means to shift said second condition placed in said single magnetic core from magnetic core to magnetic core along said chain, selected ones of said magnetic cores being arranged to produce an output pulse upon a change in the condition thereof, a plurality of output circuits each selectively connected to certain ones of said selected magnetic cores and responsive to each of said output pulses to produce a signal pulse of longer duration than that of said output pulse, said selected magnetic cores each being connected to at least one of said output circuits, a separate output terminal connected to each of said output circuits, said output circuits each operating to apply the signal pulses produced by the operation thereof to the one of said terminals connected thereto.

9. A combination as defined in claim 8, and wherein said register is a closed loop shift register, said second condition placed in said single magnetic core and shifted from magnetic core to magnetic core along said chain being continually circulated through said register.

10. In combination, first and second shift registers each including a chain of magnetic cores, each of said magnetic cores being capable of operation in either one of two conditions, a switching circuit connected to both of said registers for determining the condition of operation of each of said magnetic cores, a first driving unit connected between said first register and said switching circuit and responsive to the operation of said switching circuit to apply a series of current pulses to the magnetic cores in said first register, a second driving unit connected between said second register and said first register and responsive to the operation of said first register by said switching circuit to apply a series of current pulses to the magnetic cores in said second register, means for operating said switching circuit to first place all of said magnetic cores in one of said conditions, said switching circuit being operated by said means to next place a single one of the magnetic cores in each of said registers in the second one of said conditions, the magnetic cores in said chains being successively operated in response to said current pulses from the respective driving units to shift said second condition placed in said single magnetic cores from magnetic core to magnetic core along the respective chains of magnetic cores in said registers, selected ones of the magnetic cores in each of said registers being arranged to produce an output pulse upon a change in the condition thereof, a plurality of output circuits each selectively connected to certain ones of said selected magnetic cores and responsive to each of said output pulses to produce a signal pulse of longer duration than that of said output pulse, said selected magnetic cores each being connected to at least one of said output circuits, a separate output terminal connected to each of said output circuits, said output circuits each operating to apply the signal pulses produced by the operation thereof to the one of said terminals connected thereto.

11. A combination as defined in claim 13 and wherein said registers are each connected as closed loop shift registers, said second condition placed in said single magnetic cores and shifted from magnetic core to magnetic core along each of said chains being continually circulated through said respective registers, said output circuits each including an integrating circuit.

12. A timing circuit as defined in claim 4 and wherein a separate driving unit is coupled to each of said registers, said driving units each including a gating circuit responsive to recurring waves supplied by the operation of said switching circuit, a blocking oscillator circuit coupled to the output of said gating circuit, and a driving circuit coupled between the output of said blocking oscillator circuit and the register to which the driving unit is coupled, whereby each of said driving units is arranged to apply shift current pulses to the magnetic cores included in the respective register.

13. A timing circuit as defined in claim 7 and wherein a separate driving unit is coupled to each of said registers, said driving units each including a gating circuit responsive to recurring waves supplied by the operation of said switching circuit, a blocking oscillator circuit coupled to the output of said gating circuit, and a driving circuit coupled between the output of said blocking oscillator circuit and the register to which the driving unit is coupled, whereby each of said driving units is arranged to apply shift current pulses to the magnetic cores included in the respective register.

14. A combination as defined in claim 8 and wherein said driving unit includes a gating circuit coupled to said switching circuit, a blocking oscillator circuit coupled to the output of said gating circuit, and a driving circuit coupled between the output of said blocking oscillator circuit and said magnetic cores.

15. In combination, a plurality of shift registers each including a chain of magnetic cores, each of said magnetic cores being capable of operation in either one of two conditions, a switching circuit connected to all of said registers for determining the condition of operation of each of said magnetic cores, means for operating said switching circuit to first place all of said magnetic cores in one of said conditions and thereafter to place a single magnetic core in each of said registers in the second one of said conditions, the magnetic cores in each of said chains being successively operated upon a further operation of said switching circuit by said means to shift said second condition placed in said single magnetic cores from magnetic core to magnetic core along each of said chains in the respective shift registers.

References Cited in the file of this patent

UNITED STATES PATENTS

| | | |
|---|---|---|
| 2,652,501 | Wilson | Sept. 15, 1953 |
| 2,654,080 | Browne | Sept. 29, 1953 |
| 2,700,502 | Hamilton et al. | Jan. 25, 1955 |
| 2,700,503 | Crosman | Jan. 25, 1955 |
| 2,720,597 | Williams | Oct. 11, 1955 |
| 2,768,367 | Rajchman | Oct. 23, 1956 |
| 2,776,418 | Townsend | Jan. 1, 1957 |
| 2,784,390 | Chien | Mar. 5, 1957 |
| 2,832,951 | Browne | Apr. 29, 1958 |
| 2,844,815 | Winick | July 22, 1958 |